G. W. MILLNER.
Pipe and Bolt Vise.

No. 167,110.  Patented Aug. 24, 1875.

WITNESSES:
A. B. Robertson
Solon C. Kemon

INVENTOR:
George W. Millner
BY
ATTORNEYS.

UNITED STATES PATENT OFFICE.

GEORGE W. MILLNER, OF CHARLOTTE TOWN, PRINCE EDWARD ISLAND.

IMPROVEMENT IN PIPE AND BOLT VISES.

Specification forming part of Letters Patent No. 167,110, dated August 24, 1875; application filed July 1, 1875.

*To all whom it may concern:*

Be it known that I, GEORGE W. MILLNER, of Charlotte Town, Prince Edward Island, have invented a new and Improved Vise; and I do hereby declare that the following is a full, clear, and exact description of the same, reference being had to the accompanying drawing, forming part of this specification, in which—

Figure 1:
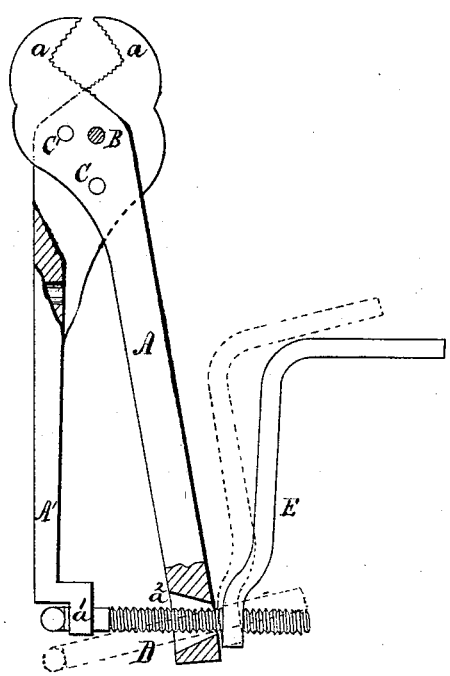
Figure 2:
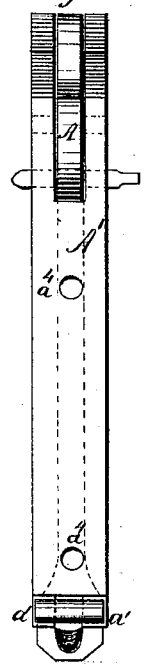

Figure 1 is a side elevation, partly broken away; Fig. 2, an edge view in elevation.

The invention relates to vises especially adapted to holding bolts or pipes of varying size; and consists in the improvement of those now in public use, as hereinafter described, and pointed out in the claim.

A represents a lever, fulcrumed upon a pin, B, that may be changed to one of several holes C, thus enabling the serrated jaws $a\ a$ to hold a bolt or pipe of larger or smaller diameter. It will be perceived that the lever A is supported between the bifurcations of a bar, A′, that has a slotted rear projection, $a^1$, while the lever has an oblong hole, $a^2$, at the end. D is a T-bolt, threaded and receiving a lever-nut, E. By placing the bolt in open-slotted end projection $a^1$, with the head thereunder and across it, the nut E may be screwed down, causing the jaws $a\ a$ to bite on the bolt or pipe, and hold it fast. In order to accommodate the throw of jaws $a\ a$ to bolts and pipes of different magnitude, it is only necessary to change the hole in which detachable fulcrum-pin B is inserted.

This vise may be readily carried in the hand of the jobber, and may be easily fastened by holes $a^4$ and suitable screw-bolts to a post or beam. It may be fastened with jaw extending over bench to right hand, and screw to the left for pipes, or fastened to the edge of bench to receive a bolt perpendicularly.

It will be perceived that by using the bifurcated bar A′ the lever A is supported and guided so that it cannot vary to one side or the other, but must always work in its proper plane or direction, and that the screw-bolt may be connected or disconnected with the open-slotted projection by reason of the oblong hole $a^2$. Thus the jaw may not only be easily clamped, but may be quickly unclamped, so that the pipe may be at once liberated without drawing one end through the vise.

Having thus described my invention, what I claim as new is—

A pipe and bolt vise consisting of T-screw D, combined with lever A, having oblong hole $a^2$, and bar A′, having open-slotted end projection $a^1$, as and for the purpose specified.

GEORGE WILLIAM MILLNER.

Witnesses:
JOHN D. MCLEOD,
JOHN HIGGINS.